United States Patent [19]

Sparling

[11] 4,153,285

[45] May 8, 1979

[54] CARRYING DEVICE FOR A GENERALLY RECTILINEAR ARTICLE

[76] Inventor: Michael F. Sparling, 119 Ardmore Ave., Providence, R.I. 02908

[21] Appl. No.: 872,046

[22] Filed: Jan. 25, 1978

[51] Int. Cl.² ............................................. A61G 19/00
[52] U.S. Cl. ........................................... 294/15; 27/27
[58] Field of Search ..................... 296/15, 33, 67 BB; 16/110 R, 110.5; 27/27

[56] References Cited

U.S. PATENT DOCUMENTS

| | | | |
|---|---|---|---|
| 638,075 | 11/1899 | St. Jean | 27/27 |
| 2,802,253 | 8/1957 | Birck | 294/15 |

*Primary Examiner*—James B. Marbert
*Attorney, Agent, or Firm*—Barlow & Barlow

[57] ABSTRACT

A carrying device which may be placed under a generally rectilinear article, such as an air conditioner or television, and which is provided at its opposite ends with handles which may be grasped by two or more people to lift the article in a more convenient manner than by trying to embrace the article with a rope or strap for lifting purposes.

5 Claims, 4 Drawing Figures

CARRYING DEVICE FOR A GENERALLY RECTILINEAR ARTICLE

BACKGROUND OF THE INVENTION

Usually a heavy article is embraced with a strap or rope for convenience providing a grip hold of the article to allow the article to be moved. In some instances handles have been devised such as in U.S. Pat. No. 2,802,253 of Aug. 13, 1957, in order to ease the handling of a relatively heavy article.

SUMMARY OF THE INVENTION

This device comprises two sets of handles for handling the article. Each set comprises two units, each of which units has a horizontal body portion to engage the undersurface of the article to be carried and upstanding portions to engage the generally vertical sides of the article to be carried with handles extending from the upstanding portions which may be gripped by the persons lifting the article. The two units, however, are attached together by flexible material such as a tape which is reeled on one unit and extends to the other unit but permits their separation to receive articles of different widths as it is positioned under the article to be carried. As the weight of the article to be carried engages the body portion of the unit which carries the reel, it clamps the flexible material so that it cannot be withdrawn from the reel any further and positions the two units the distance apart to which they have been extended to receive the article, thus fitting the units to the size of the article.

DESCRIPTION OF THE PREFERRED EMBODIMENT

Figure 1:
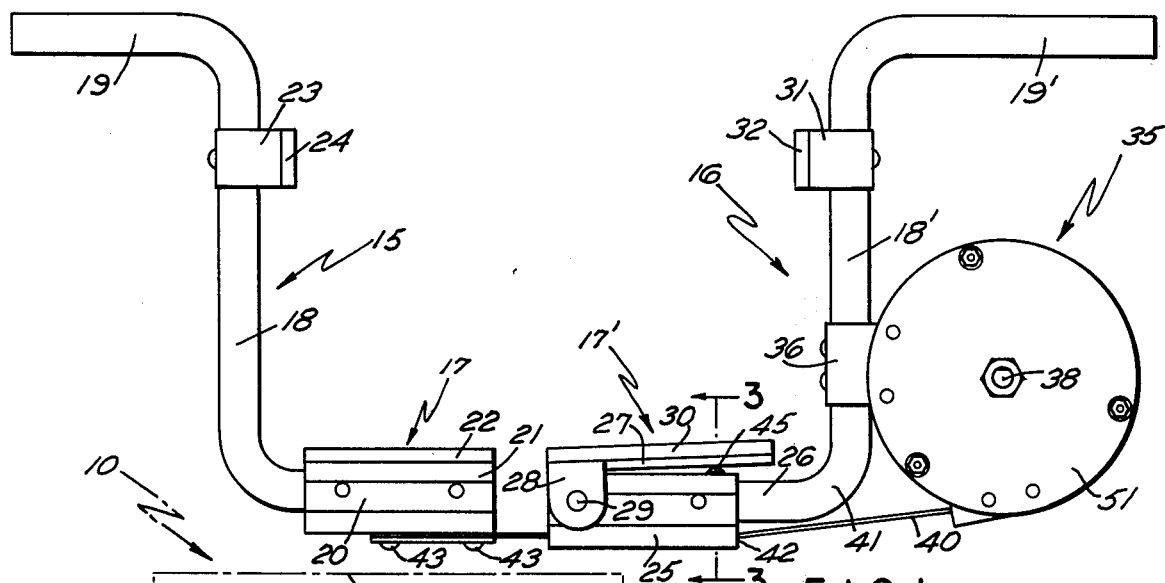
FIG. 1 is an elevation of two units showing the reel and flexible material on the reel as extending from one unit to the other.
Figure 2:
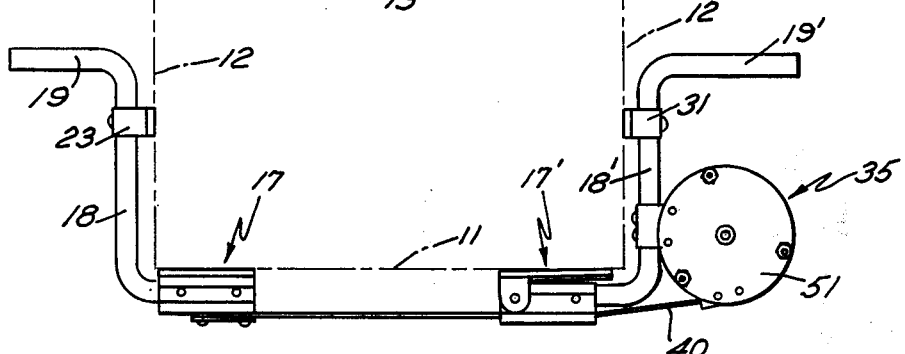
FIG. 2 is a similar view but showing in dotted lines the article to be carried as positioned in the carrying device and in the position to lock the flexible material on the reel against further unreeling.

With reference to FIG. 2 of the drawings, the article to be carried, generally designated 10, is of a generally rectilinear shape having a bottom portion 11 and generally upstanding vertical sides 12 and a top 13. The carrying device, which will usually be positioned under one end of the article 10 with a similar device positioned under the other end of the article 10, comprises two units designated generally 15 and 16, see FIG. 1. Each of the units 15, 16 has a body portion 17, 17' which extend generally horizontally, and thence vertically as upstanding portions 18, 18' that are integrally formed therewith. Handle portions 19, 19' extend outwardly from each of the upstanding portions.

The unit 15 has, along the body portion 17, a broadened support 21 clamped onto the cylindrical portion 20 of the body portion 17. Upon the upper surface of this support 21 there is a pad 22 of some soft material, such as rubber, which will not mar the surface of the article to be carried. On the upstanding portion 18 there is a bracket 23 clamped to the cylindrical upstanding portion and faced with a soft material 24, such as rubber, which will not scratch or mar the article to be carried.

The unit 16 has clamped on the body portion 17' a broadened support 25 which embraces the cylindrical portion 26 of the body 17' and has a lever 27 pivoted by ears 28 and pin 29 thereon for purposes which will be presently described. On the upper surface of the lever 27 there is a rubber pad or soft engaging portion 30. A bracket 31 is mounted upon the upstanding portion 18' and is faced with rubber or some material 32 which will not scratch or mar the article to be carried.

Figure 3:
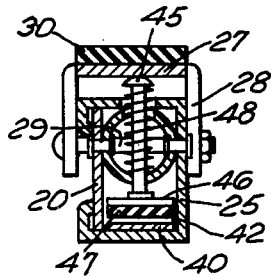
FIG. 3 is a section on lines 3—3 of FIG. 1.
Figure 4:
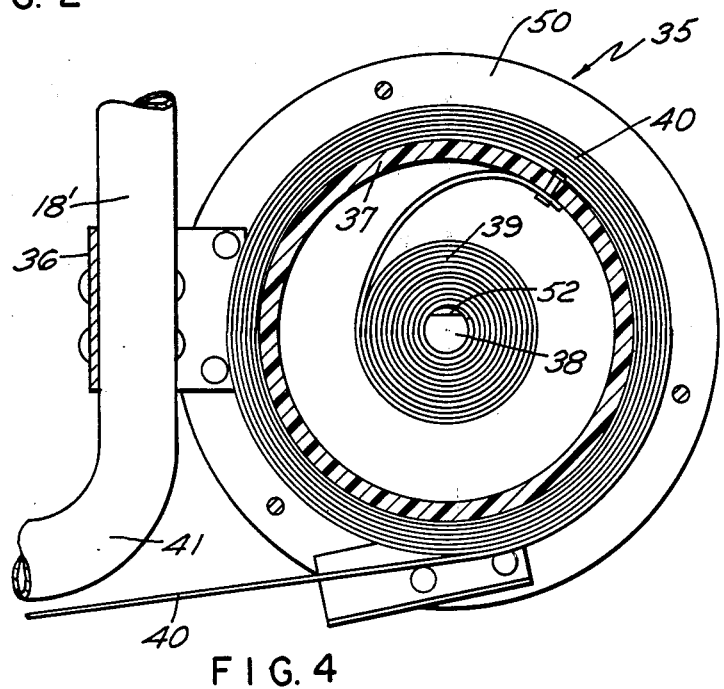
FIG. 4 is a fragmental view showing on a larger scale the reel in section and its support upon the upstanding portion of one of the units.

A reel designated generally 35 is mounted by means of a clamp 36 upon the upstanding portion 18' of the unit 16 and has side plates 50 and 51 fixed to the clamp 36. The side plates are punched with D apertures that receive flats 52 of a fixed axle 38 that is secured for axial movement by nuts. A rotary drum (see FIG. 4) 37 is rotatably mounted upon an axle 38 and is rotated in one direction by a coiled spring 39 having its inner end fixed on axle 38 and outer end fixed to drum 37. Upon this drum there is spirally wound flexible material 40 which is shown herein as a relatively flat, thin and flexible tape or ribbon. The position of the drum is such as to direct the tape just clear of the bend 41 of the junction between the body portion 17' and the upright portion 18'. This tape extends through a guide 42 in the lower portion of the clamp 25 and, as can be seen in FIG. 3, over to the support 20 where it is fixedly attached in position by fastenings 43. As the two units 15 and 16 are moved apart to accommodate a certain width of article, the tape will unreel against the action of the spring 39 until the two units are far enough apart to receive the article to be carried. At that point the article may be placed into position as shown in FIG. 2 and the lever 27 will be swung downwardly about its pivot 29 by the weight of the article 10. The undersurface of this lever will engage the head 45 of a pin which has an enlarged foot portion 46 which is provided with a resilient gripping material 47 to engage the tape 40 at the portion which is located in the guide 42. The pressure of the article to be carried on this pin will clamp the tape 42 in position so that the two units 15 and 16 cannot be further separated and dislodged from the article.

When the article is removed from the carrying device, a spring 48 will engage the head of the pin 45 and lift it from engagement with the tape permitting the units to be separated further if desired for removal from the article and when the article is removed and the units are free of the article, then the tape will be reeled upon the drum 37 by means of the spring 39.

I claim:

1. A carrying device for a generally rectilinear article comprising two units each comprising a body portion to engage the undersurface of the article to be carried, upstanding portions to engage the generally vertical sides of the article to be carried and handles extending outwardly from said upstanding portions, a reel of flexible material carried by one unit, said flexible material secured to said other unit and unreeling from said reel as said units are moved apart, and means on the unit carrying the reel to lock the flexible material against unreeling when the article to be carried rests upon the body portion of the unit carrying the reel.

2. A carrying device as in claim 1 wherein means guides the flexible material along the underside of the body portion of the unit carrying the reel.

3. A carrying device as in claim 1 wherein the reel is mounted on the upstanding portion of the unit carrying the reel.

4. A carrying device as in claim 1 wherein the upstanding portions includes brackets to engage the generally vertical sides of the article to be carried.

5. A carrying device as in claim 1 wherein the reel is equipped with a spring to wind the flexible material thereon.

* * * * *